US012559038B2

(12) United States Patent
Bos et al.

(10) Patent No.: US 12,559,038 B2
(45) Date of Patent: Feb. 24, 2026

(54) VEHICLE CONSOLE

(71) Applicant: Magnesium Products of America Inc., Eaton Rapids, MI (US)

(72) Inventors: Jeremy R. Bos, Strathroy (CA); Sean G. Atkin, Strathroy (CA); Joshua Lee McConnell, Marysville, OH (US); David Richard Greer, Jr., Northville, MI (US)

(73) Assignee: Magnesium Products of America Inc.

(*) Notice: Subject to any disclaimer, the term of this patent is extended or adjusted under 35 U.S.C. 154(b) by 377 days.

(21) Appl. No.: 18/306,783

(22) Filed: Apr. 25, 2023

(65) Prior Publication Data

US 2023/0347828 A1     Nov. 2, 2023

Related U.S. Application Data

(60) Provisional application No. 63/335,994, filed on Apr. 28, 2022.

(51) Int. Cl.
| | |
|---|---|
| B60R 7/04 | (2006.01) |
| B62D 25/20 | (2006.01) |
| B60R 11/00 | (2006.01) |
| B62D 29/00 | (2006.01) |

(52) U.S. Cl.
CPC ............ B60R 7/04 (2013.01); B62D 25/2009 (2013.01); *B60R 2011/0007* (2013.01); *B62D 25/2018* (2013.01); *B62D 29/008* (2013.01)

(58) Field of Classification Search
CPC .............. B60R 7/04; B60R 2011/0007; B62D 25/2009; B62D 29/008; B62D 25/145; B62D 25/14; B62D 25/2018

USPC ....... 296/24.34, 70, 72, 37.8, 37.12, 187.03, 296/187.05, 187.08
See application file for complete search history.

(56) References Cited

U.S. PATENT DOCUMENTS

| | | | |
|---|---|---|---|
| 5,085,481 A * | 2/1992 | Fluharty | ................... B60R 7/04 |
| | | | 296/37.14 |
| 6,719,343 B2 | 4/2004 | Emerling et al. | |
| 7,401,830 B2 | 7/2008 | Akimoto et al. | |

(Continued)

FOREIGN PATENT DOCUMENTS

JP      2016-210315 A     12/2016

OTHER PUBLICATIONS

International Preliminary Report on Patentability issued in connection with PCT/US2023/019823 dated Oct. 29, 2024.

(Continued)

*Primary Examiner* — Roger L Pang
(74) *Attorney, Agent, or Firm* — Foley & Lardner LLP

(57) ABSTRACT

A console for a vehicle includes a first bracket and a second bracket disposed opposite the first bracket in a mirroring configuration relative to the first bracket. Each of the first bracket and the second bracket includes a body, an upper arm extending from an upper front portion of the body and configured to couple to a vehicle frame, a lower arm extending from a lower front portion of the body and configured to couple to a vehicle frame, and a first end and a second end, wherein the first end includes a first leg configured to couple to a floor of the vehicle and the second end includes a second leg configured to couple to the floor of the vehicle. The first bracket and the second bracket are mutually coupled in at least one region.

20 Claims, 8 Drawing Sheets

(56)　　　　　　References Cited

U.S. PATENT DOCUMENTS

| | | | |
|---|---|---|---|
| 8,414,047 | B2 | 4/2013 | Vasko et al. |
| 8,444,196 | B2 * | 5/2013 | Arndt ......................... B60R 7/04 |
| | | | 296/187.05 |
| 10,232,786 | B1 * | 3/2019 | Mullen ...................... B60R 7/04 |
| 10,377,317 | B2 | 8/2019 | Ranganathan et al. |
| 11,718,413 | B2 * | 8/2023 | Hartner .................. B64D 43/00 |
| | | | 244/117 R |
| 2004/0206858 | A1 | 10/2004 | Rockafellow et al. |
| 2006/0113811 | A1 | 6/2006 | Tanaka et al. |
| 2018/0194304 | A1 * | 7/2018 | Hupman ................. B60R 11/02 |
| 2023/0182827 | A1 * | 6/2023 | Inami .................... B60K 11/02 |
| | | | 296/193.07 |

OTHER PUBLICATIONS

Foreign Search Report on PCT Dtd Jul. 17, 2023.
Extended European Search Report issued in EP Appl. No. 23797153.6
dated Jul. 17, 2025.

* cited by examiner

VEHICLE CONSOLE

CROSS-REFERENCE TO RELATED APPLICATIONS

This application claims the benefit of and priority to U.S. Patent Application No. 63/335,994, filed Apr. 28, 2022, the entire disclosure of which is hereby incorporated by reference herein.

BACKGROUND

The present disclosure relates generally to the field of consoles for vehicles and, more specifically, lightweight cross-car beams.

Often, console performance requirements are limited to bearing vertical loads and providing storage within the vehicle. Many consoles include various plastic components, which are supported by minimal steel reinforcements as needed to satisfy performance requirements—such as noise, vibration, and harshness (NVH) performance, while other consoles may be manufactured by steel stampings. However, such existing consoles can be heavy or do not contribute to performance (e.g., crash performance, load bearing performance, NVH performance, etc.).

Accordingly, it would be advantageous to provide a console that reduces overall mass in a vehicle and has an increased contribution to vehicle performance.

SUMMARY

One embodiment of the disclosure relates to a console for a vehicle including a first bracket and a second bracket disposed opposite the first bracket in a mirroring configuration relative to the first bracket. Each of the first bracket and the second bracket includes a body, an upper arm extending from an upper front portion of the body and configured to couple to a vehicle frame, a lower arm extending from a lower front portion of the body and configured to couple to a vehicle frame, and a first end and a second end. The first end includes a first leg configured to couple to a floor of the vehicle and the second end includes a second leg configured to couple to the floor of the vehicle. The first bracket and the second bracket are mutually coupled in at least one region.

In various embodiments, each of the first bracket and the second bracket includes a magnesium alloy. In some embodiments, each of the first bracket and the second bracket further includes a third leg configured to couple to the floor of the vehicle. In other embodiments, the first leg of the first bracket or the first leg of the second bracket are angled toward each other. In yet other embodiments, the console further includes a first receptacle and a second receptacle, wherein each of the first receptacle and the second receptacle are configured to be retained between the first bracket and the second bracket. In various embodiments, at least one of the first receptacle or the second receptacle includes an upper lip, the upper lip being configured to engage with one or more retention features of each of the first bracket and the second bracket. In some embodiments, at least one of the first bracket or the second bracket comprises one or more ridges.

According to another aspect of the present disclosure, a console for a vehicle includes a first end and a second end opposite the first end, a first bracket, and a second bracket disposed opposite the first bracket in a mirroring configuration relative to the first bracket. Each of the first bracket and the second bracket includes a body and a lower arm extending from a lower front portion of the body and configured to couple to a vehicle frame, wherein the lower arm extends toward the first end and the body is disposed at the second end. The first end includes a first floor attachment configured to couple the console to a floor of the vehicle and the second end includes a second floor attachment configured to couple the console to the floor of the vehicle. The first bracket and the second bracket are mutually coupled in at least one region.

In various embodiments, each of the first floor attachment and the second floor attachment includes a first leg and a second leg. In some embodiments, each of the first bracket and the second bracket further includes an upper arm extending from an upper front portion of the body. In other embodiments, the upper arm of the first bracket is conjoined with the upper arm of the second bracket. In yet other embodiments, each of the upper arm of the first bracket and the upper arm of the second bracket are configured to couple to the vehicle frame. In various embodiments, the first bracket and the second bracket form at least one compartment therebetween. In some embodiments, the console further includes at least one receptacle, wherein the at least one receptacle is configured to be received within the at least one compartment. In other embodiments, the at least one compartment includes a first compartment and a second compartment, the at least one receptacle includes a first receptacle and a second receptacle, and the first receptacle is received within the first compartment and the second receptacle is received within the second compartment. In yet other embodiments, the at least one receptacle is removably coupled to the at least one compartment. In other embodiments, each of the first bracket and the second bracket include at least one protruding member extending from the body, the at least one protruding member configured to couple to at least one of a cover or lid.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure describes a console for a vehicle, and specifically a cross-car beam for a vehicle, that reduces overall mass in a vehicle and has an increased contribution to vehicle performance as compared to existing vehicle consoles. In particular, the console is configured to distribute vehicle loads throughout the structure of the console, thereby contributing to a reduction in overall mass and improving performance as compared to existing consoles which do not distribute loads therethrough.

Figure 1:
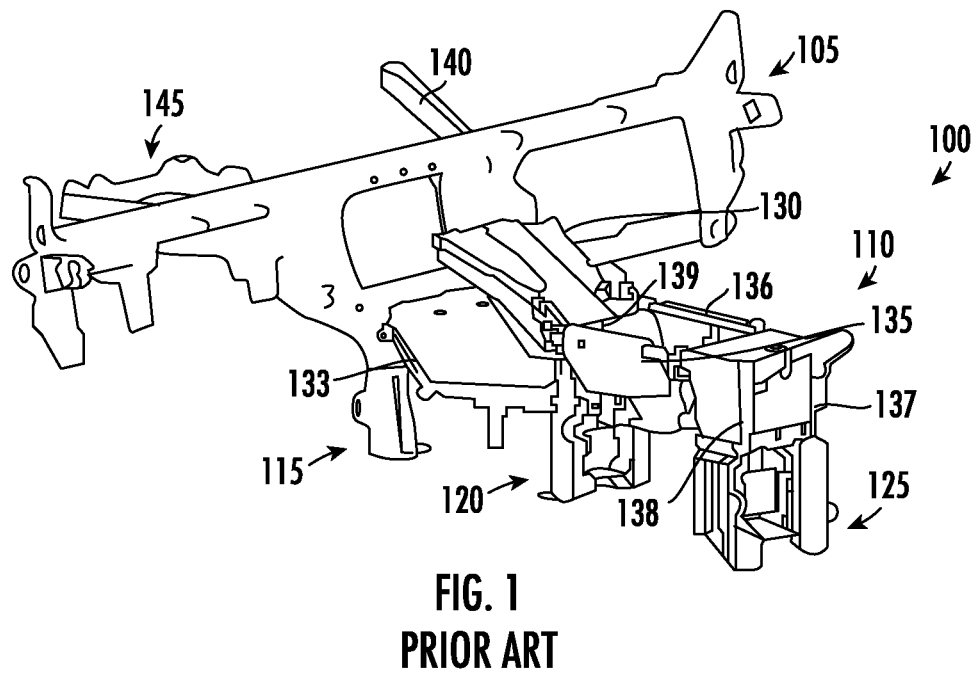
FIG. 1 is a perspective view of an existing console and cross-car beam assembly for a vehicle.
Figure 2:
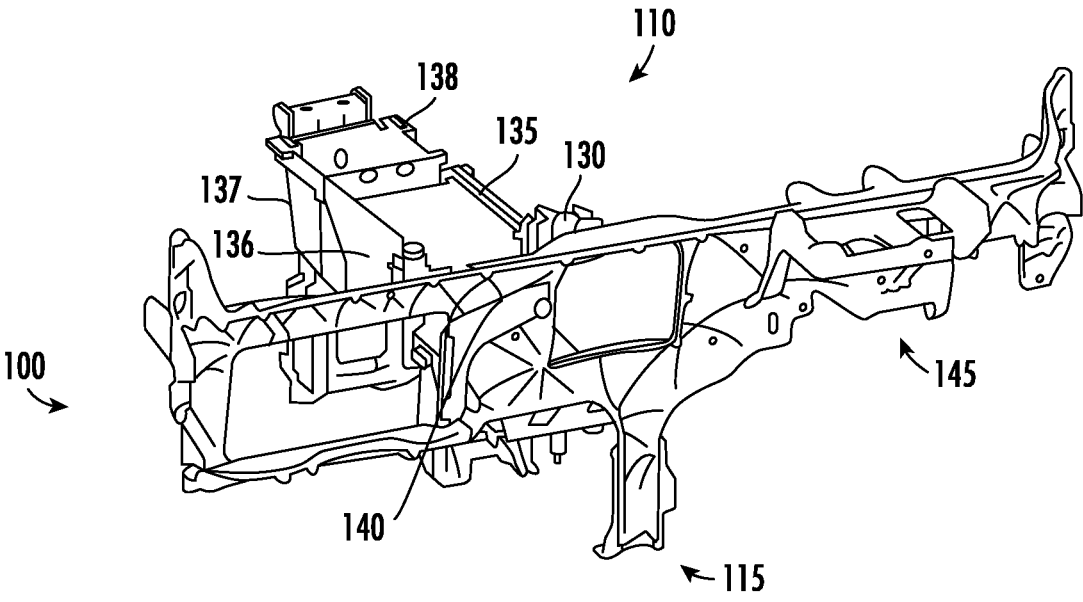
FIG. 2 is an alternate perspective view of the console and cross-car beam assembly of FIG. 1.

Referring to FIGS. 1 and 2, a console and cross-car beam assembly 100 for a vehicle is shown. The console and cross-car beam assembly 100 may be part of an instrument panel of a vehicle and extends between seats of a vehicle. As shown, the console and cross-car beam assembly 100 includes a cross-car beam (e.g., ejector rib structure) 105, which is coupled to a console 110 (or "console assembly"). The console 110 is anchored to a floor of the vehicle via a first floor attachment 115, a second floor attachment 120, and a third floor attachment 125. The console 110 also includes an upper bridge component 130 and a lower bridge component 133 that couple to a bracket 139, which is disposed between the cross-car beam 105 and brackets 135, 136, 137, and 138. As shown, the first floor attachment 115 extends from the cross-car beam component 105, the second floor attachment 120 extends from the bracket 139 (e.g., reinforcement rib), and the third floor attachment 125 extends from the brackets 137, 138. The brackets 135, and 136 may provide nominal structural support or framing for one or more storage units, arm rests, controls, or auxiliary features within a vehicle. The bracket 139 may be configured to couple the console assembly 110 to one or more structural features within the vehicle. As shown, the cross-car beam 105 includes an arm 140 and a support 145, which are configured to facilitate coupling and structural support of the cross-car beam 105 within the vehicle.

The console and cross-car beam assembly 100 may be configured to transfer an applied load (e.g., from a vehicular collision) vertically to the floor of the vehicle. During impact, the arm 140 and support 145 are configured to transfer the impact load through the cross-car beam 105 and the first floor attachment 115 such that the impact load is ultimately transferred to the vehicle floor. Accordingly, the components within the console and cross-car beam assembly 100 may be made of varying material types based on desired structural needs. For example, the arm 140, support 145, cross-car beam 105, and/or first floor attachment 115 may include one or more metallic materials (e.g., aluminum, steel, magnesium), whereas the brackets 135, 136, 137, 138 and 139 and the second and third floor attachments 120, 125 may include one or more plastic or non-metallic materials. Due to the configuration of the console and cross-car beam assembly 100 and the material composition of its components, the console and cross-car beam assembly 100 may only transfer load vertically, with the console 110 minimally contributing to load transfer and distribution. Furthermore, due to the number of components required for the console 110, manufacture and assembly of the console and cross-car beam assembly 100 may be complex and involved. Moreover, in cases where additional structural support is needed, the console and cross-car beam assembly 100 may include various additional steel components configured to provide resistance to applied load and/or facilitate load transfer within the vehicle.

Figure 3:
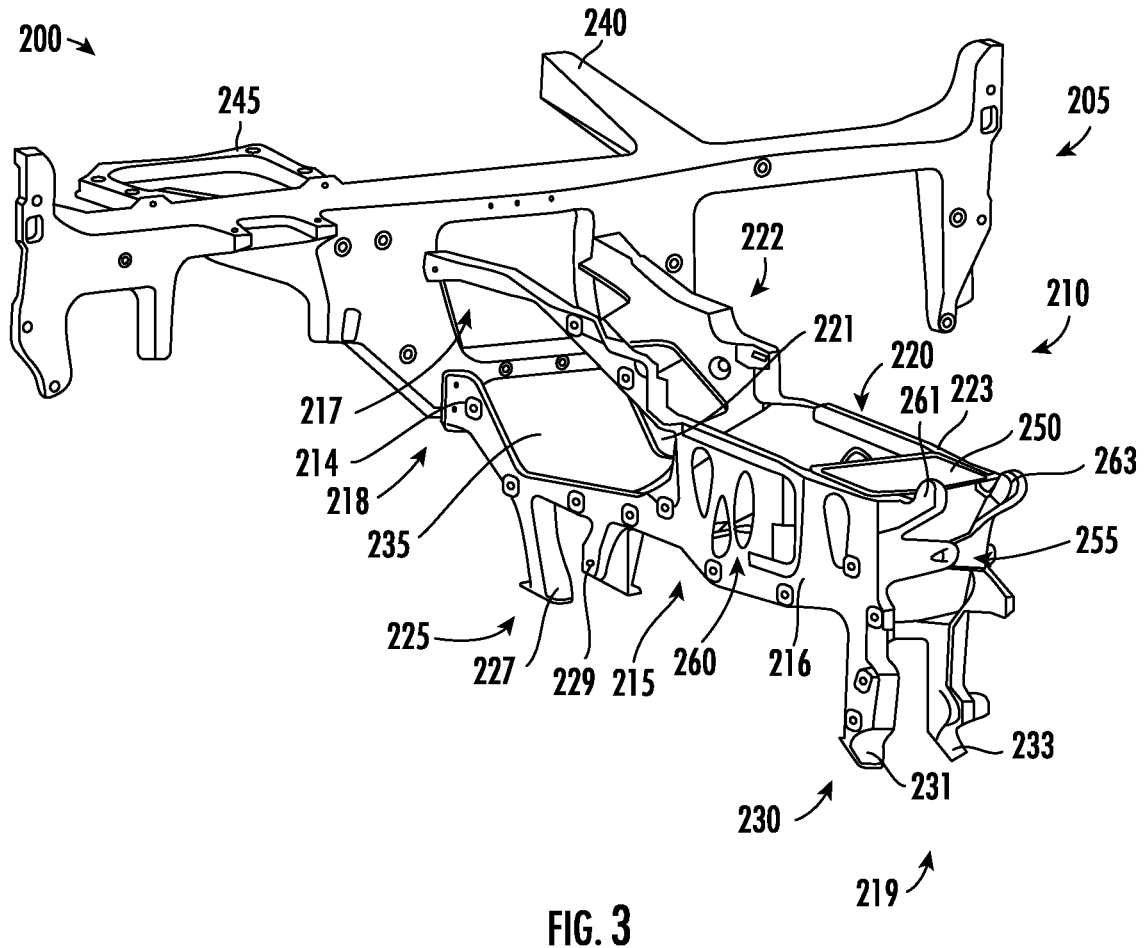
FIG. 3 is a perspective view of a console and cross-car beam assembly for a vehicle, according to an exemplary embodiment.
Figure 4:
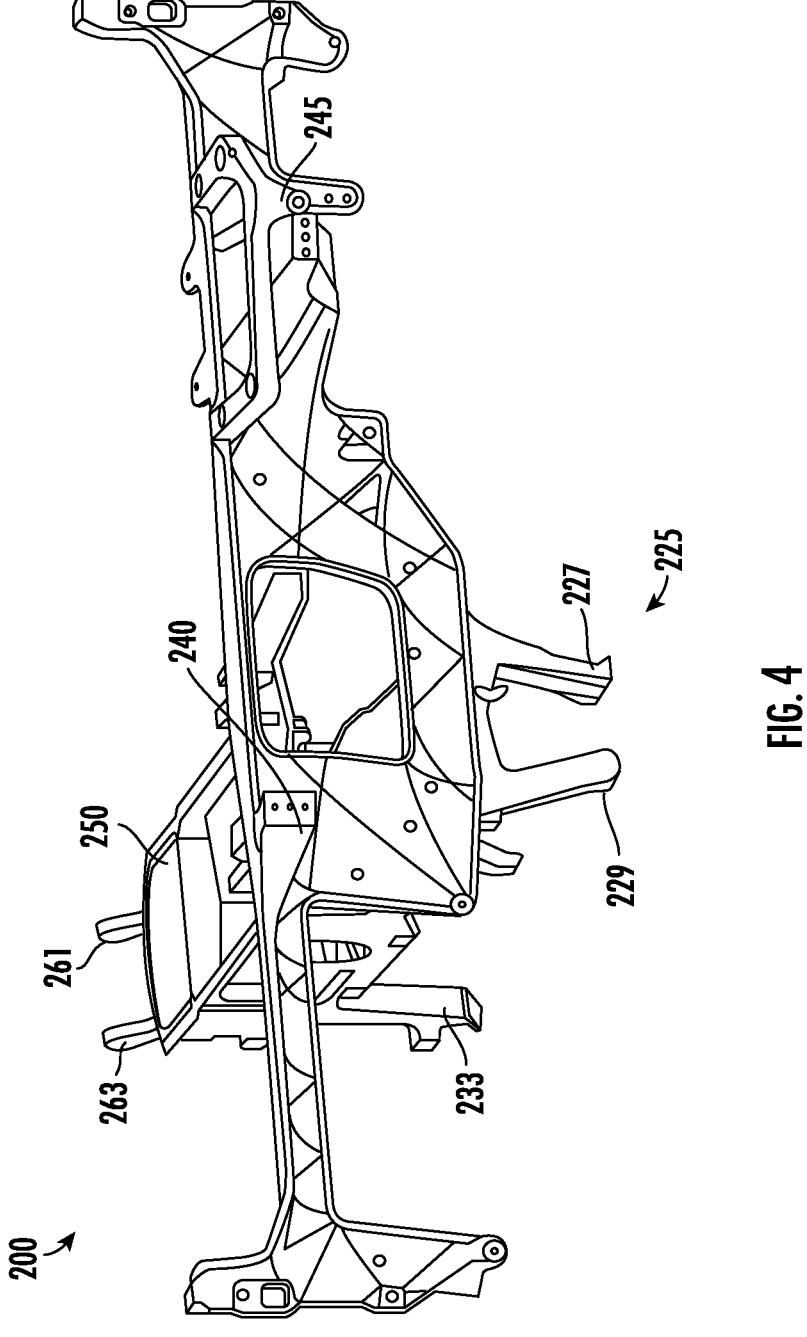
FIG. 4 is an alternate perspective view of the console and cross-car beam assembly of FIG. 3.

FIGS. 3 and 4 show a console and cross-car beam assembly 200, according to an exemplary embodiment. The console and cross-car beam assembly 200 may be part of an instrument panel of a vehicle and extends between seats of a vehicle. The console and cross-car beam assembly 200 is configured to reduce overall weight within the vehicle, increase contribution to crash performance (e.g., increase contribution in load transfer), and reduce complexity compared to existing assemblies (e.g., console and cross-car beam assembly 100) by requiring fewer components. As shown, the console and cross-car beam assembly 200 includes a cross-car beam 205, such as a bracket or rib structure, configured for supporting a display or utility panel within a vehicle. The console and cross-car beam assembly 200 also includes a console 210 (or "console assembly"), which is coupled to the cross-car beam 205 at a first end 218, and may be coupled to one or more anchor points within the vehicle at a second end 219. As shown, the console 210 includes a first bracket 215 and a second bracket 220, which are arranged in parallel such that the second bracket 220 is opposite the first bracket and disposed in a mirroring configuration. The first bracket 215 includes a body 216, which is formed to enable storage within the console and/or to provide nominal support for a lower arm 214, which extends from a lower portion of the body 216 and couples to the cross-car beam 205. As shown, the lower arm 214 may arch upward from the body 216 toward the cross-car beam 205. The first bracket 215 also includes an upper arm 217, which extends from an upper portion of the body 216 and couples to the cross-car beam 205. As shown, the upper arm 217 may be arched as it extends toward the cross-car beam 205. Similar to the first bracket 215, the second bracket 220 includes a body 223, which is formed to enable storage within the console and/or to provide support for one or more ergonomic features within the vehicle (e.g., arm rests). The second bracket 220 also includes a lower arm 221, which extends from a lower portion of the body 223 and couples to the cross-car beam 205. The lower arm 221 may arch upward from the body 223 toward the cross-car beam 205. The second bracket 220 further includes an upper arm 222, which extends from an upper portion of the body 223 and couples to the cross-car beam 205. The upper arm 222 may arch toward the cross-car beam 205.

The console 210 includes a first floor attachment 225 and a second floor attachment 230, which are configured to couple the console 210 to the floor of the vehicle. As shown, the first floor attachment 225 is disposed near the first end 218 of the console and cross-car beam assembly 200 and includes a first leg 227 extending from the first bracket 215 and a second leg 229 extending from the second bracket 220. The second floor attachment 230 is disposed near the second end 219 of the console and cross-car beam assembly 200 and includes a third leg 231 extending from the first bracket 215 and a fourth leg 233 extending from the second bracket 220. As shown, each of the first and second brackets 215 and 220 may be formed as a single piece. Accordingly, the upper arm 217, lower arm 214, and body 216 are integrally formed within the first bracket 215 and the upper arm 222, lower arm 221, and body 223 are integrally formed within the second bracket 220. Consequently, each of the first bracket 215 and the second bracket 220 may transfer loads (e.g., impact loads) applied to the vehicle and acting on the cross-car beam 205 (i.e., via the arm 240 and/or the support 245) to the floor of the vehicle via both the first and second floor attachments 225 and 230. Because the first and second brackets 215, 220 can effectively transfer load both vertically and horizontally through the console and cross-car beam assembly 200 to the floor of the vehicle, the console 210 has an increased performance contribution as compared to existing assemblies (e.g., console and cross-car beam assembly 100). Such increased performance contribution may improve not only crash ratings, but may also affect noise, vibration, and harshness (NVH) of the vehicle.

As shown in FIGS. 3 and 4, the console 210 also includes a first receptacle 235 (or "front receptacle") and a second receptacle 250 (or "rear receptacle"), which may be configured to fit between the first bracket 215 and the second bracket 220 to facilitate storage within the console 210. The first receptacle 235 may be a bin disposed near a front region of the console 210. The second receptacle 250 may be a bin disposed near a rear region of the console 210. In various embodiments, the receptacles 235, 250 are supported by a bottom surface formed between the brackets 215, 220 and are retained therebetween via a coupling 255, wherein the brackets 215, 220 are connected or conjoined. Each of the first and second brackets 215, 220 respectively include one or more protruding members 261, 263, which may facilitate coupling of the console 210 to a lid or cover. Although FIGS. 3 and 4 illustrate the members 261, 263 extending in a direction parallel with the arms 217, 222 and substantially coaxial with the legs 231, 233, the members 261, 263 may be disposed anywhere along the brackets 215, 220 and may extend in any direction suitable for facilitating anchoring of the console 210 within the vehicle and/or coupling a lid or cover. In various embodiments, each of the brackets 215, 220 may also include one or more coupling members disposed between the respective bodies 216, 223 and upper arms 217, 222, wherein the brackets 215, 220 may be mutually coupled.

Figure 5:
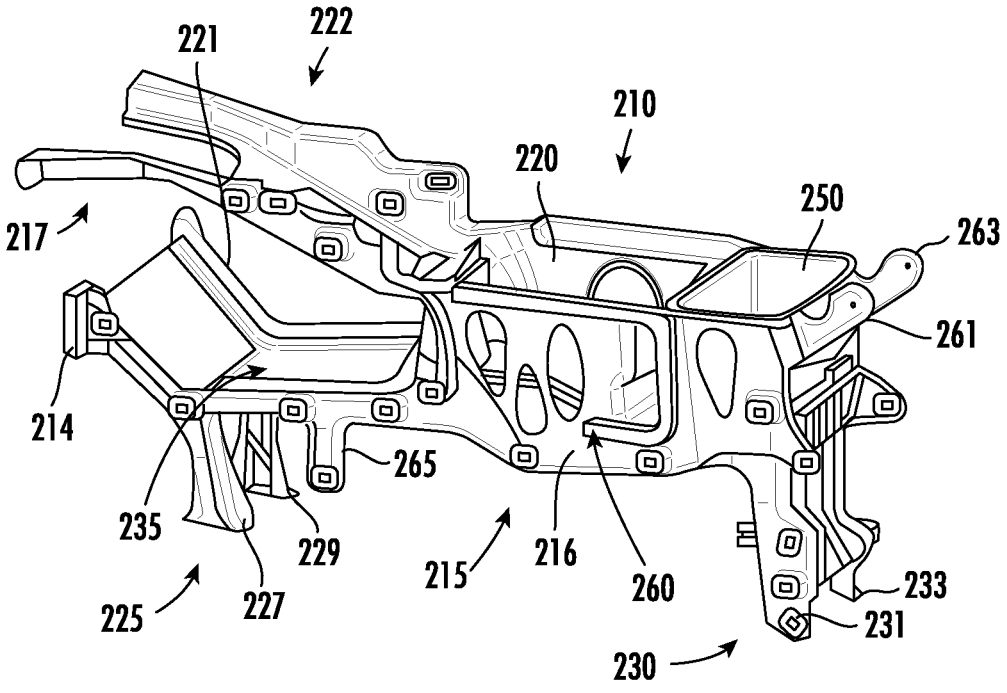
FIG. 5 is a perspective view of the console of FIG. 3, according to an exemplary embodiment.

To reduce overall weight of the console 210 (and thus of the console and cross-car beam assembly 200), the brackets 215, 220 may be optimized to reduce excess material during manufacturing. In various embodiments, each of the brackets 215, 220 may be formed through casting, wherein the brackets 215, 220 may have one or more regions having little or no material supported by one or more ribs 260. In various embodiments, the console 210 may also include one or more additional floor attachments to facilitate stability, load distribution through the brackets 215, 220, and load transmission to the floor of the vehicle. FIG. 5 shows the console 210, according to an exemplary embodiment. As shown, at least one of the brackets 215, 220 may include a third floor attachment 265 to transfer loads acting on the console 210 to the vehicle floor.

Figure 6:
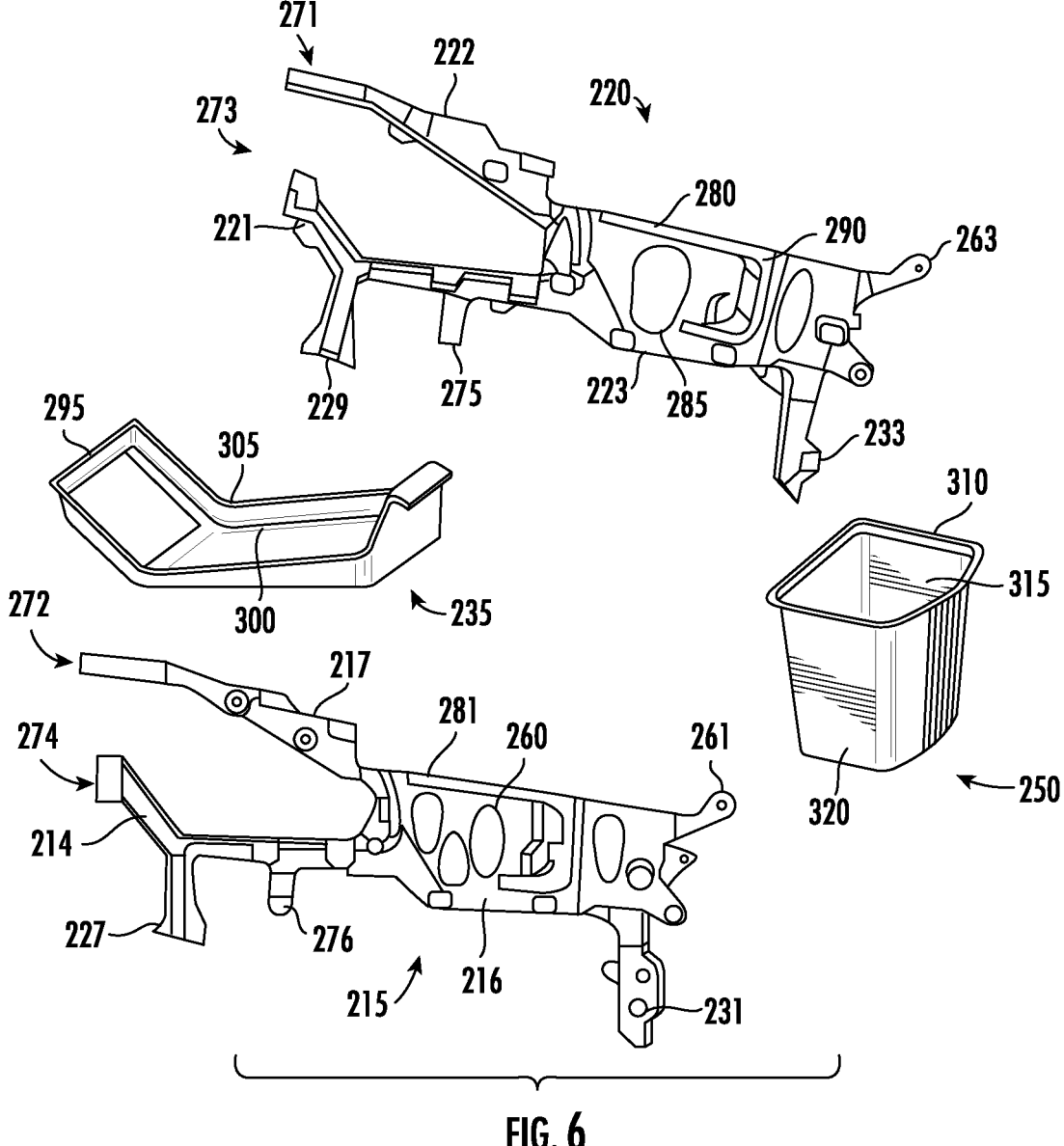
FIG. 6 is an exploded perspective view of the console of FIG. 5.
Figure 7:
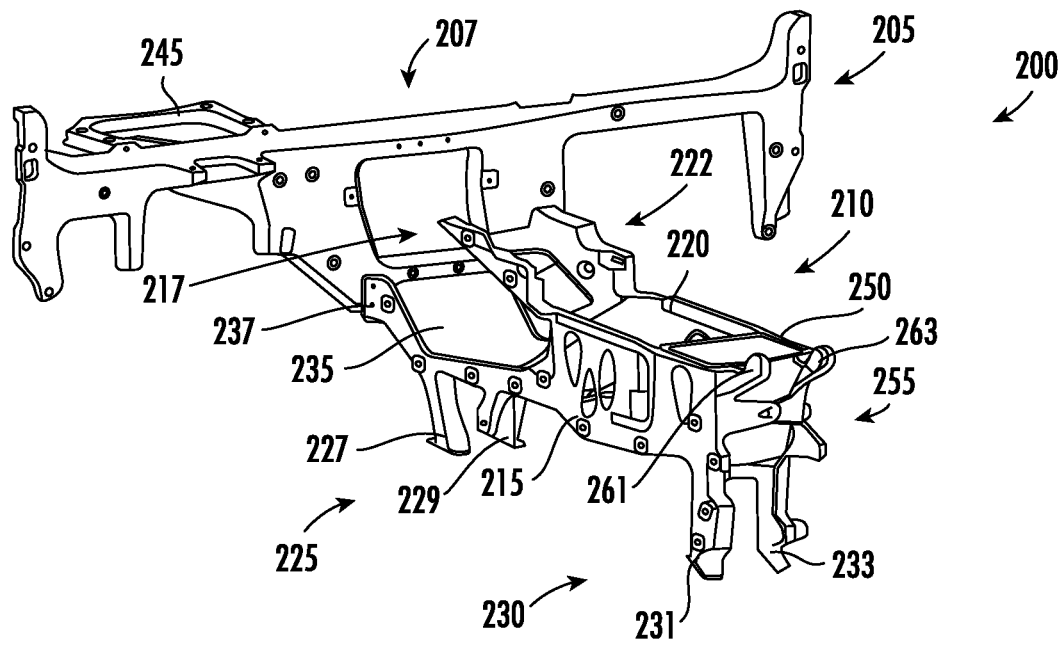
FIG. 7 is a perspective view of a console and cross-car beam assembly for a vehicle, according to another embodiment.

FIG. 6 shows an exploded view of the console 210, according to an exemplary embodiment. As illustrated, the first bracket 215 may be formed as a single piece, such as through casting. To facilitate coupling to the cross-car beam 205, each of the upper arm 217 and the lower arm 214 respectively include one or more coupling features—such as one or more apertures, recesses, ledges, fittings, and/or protrusions—disposed at an upper front end 272 and a lower front end 274. The first bracket 215 may further include one or more ridges 281 disposed along the body 216 to provide structural support and/or contribute to retaining the receptacle 250. In various embodiments, the one or more ridges 281 may be configured to engage with a sliding lid, which may be configured to couple to the console 210. Similarly, the second bracket 220 may be formed as a single piece, such as through casting. To facilitate coupling to the cross-car beam 205, each of the upper arm 222 and the lower arm 221 respectively include one or more coupling features—such as one or more apertures, recesses, ledges, fittings, and/or protrusions—disposed at an upper front end 271 and a lower front end 273. The second bracket 220 may further include one or more ridges 280 disposed along the body 223 to provide structural support and/or contribute to retaining the receptacle 250. In various embodiments, the one or more ridges 280 may be configured to engage with a sliding lid. As shown, the first bracket 215 and the second bracket 220 may also include a leg 276 and a leg 275, respectively, which form the third floor attachment 265 for the console 210. In various embodiments, the third floor attachment 265 may facilitate clipping or otherwise coupling of a cover to the console 210. As shown, the brackets 215, 220 may further include coupling members 285, 290. The coupling member 285 is disposed between the protruding member 261 and the leg 231 and the coupling member 290 is disposed between the protruding member 263 and the leg 233. As shown in FIG. 7, the coupling member 285 and the coupling member 290 may be connected to form the coupling 255 to facilitate retaining the receptacle 250 between the brackets 215, 220.

The first receptacle 235 is configured to be retained between the brackets 215, 220. As shown, the first receptacle 235 includes a first portion 295 and a second portion 300. The first portion 295 may be inclined relative to the second portion 300. In various embodiments, an angle between the first and second portions 295, 300 is configured to facilitate ease of storage within the console 210. As shown, the first receptacle 235 includes a ridge or lip 305, which may be configured to engage with one or more retention features on at least one of the brackets 215, 220 to retain the first receptacle 235 therebetween. In various embodiments, the lip 305 of the receptacle 235 may engage with one or more retention features disposed along the lower arms 214, 221. Similarly, the second receptacle 250 is configured to fit between the brackets 215, 220. As shown, the receptacle 250 includes an outer wall 315, which abuts a bottom surface 320 to define a volume therein. In various embodiments, a size and/or volume of the receptacle is configured to facilitate ease of storage or other functional uses of the console 210. As shown, the receptacle 250 includes a ridge or lip 310 disposed along an upper edge of the outer wall 315. The lip 310 may be configured to engage with or be received within one or more retention features disposed within the bodies 216, 223 to facilitate retaining the receptacle 250 therebetween. In various embodiments, at least one of the receptacles 235, 250 is removably coupled to the brackets 215, 220 (e.g., via one or more fasteners, via snap fit, friction fit, interference fit, etc.). In other embodiments, the receptacles 235, 250 are slidably fitted within the console 210 to facilitate ease of removal and replacement therein. In various embodiments, the brackets 215, 220 may form a first compartment and a second compartment, wherein the first receptacle 235 is configured to fit within the first compartment and the second receptacle 250 is configured to fit within the second compartment.

Figure 8:
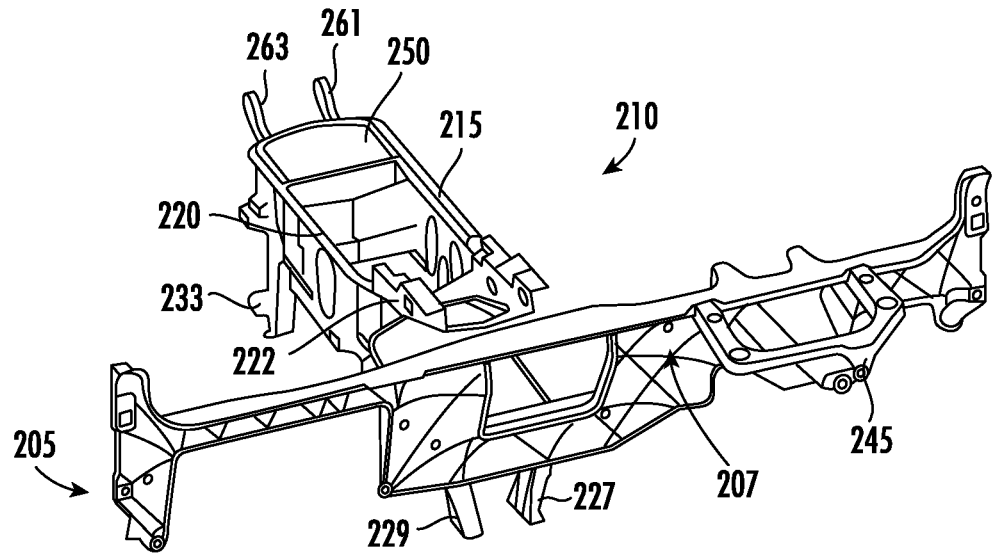
FIG. 8 is an alternate perspective view of the console of FIG. 7.

In some embodiments, the console 210 may be configured such that the upper arms 217, 222 of the respective brackets 215, 220 are conjoined or coupled at a front end nearest the cross-car beam 205, as shown in FIGS. 7 and 8. To reduce material, and thus reduce overall weight of the console 210, while maintaining structural integrity, the upper arms 217, 222 may be configured such that they do not extend to the cross-car beam 205. Accordingly, the upper arms 217, 222 may be integrally formed at an end distal to the respective bodies 216, 223 (shown in FIGS. 5 and 6) to preserve stability and structural integrity thereof. In other embodiments, the brackets 215, 220 may be configured to only have lower arms 214, 221. In yet other embodiments, the console 210 may be configured to have one, two, or three floor attachments based on a desired overall weight of the console and cross-car beam assembly 200. For example, FIGS. 7 and 8 show the console 210 having two floor attachments 225, 230. In various embodiments, a positioning of the floor attachments may be based on a desired load distribution through the console and cross-car beam assembly 200 and/or a material type of the console and cross-car beam assembly 200 (and its components). Although the figures generally show the floor attachments 225, 230 disposed on opposing ends of the brackets 215, 220, the floor attachments 225, 230 may be disposed anywhere along the length of the brackets 215, 220 that is suitable for transferring load through the console and cross-car beam assembly 200. Furthermore, although the figures generally show the floor attachment 225 as having two legs 227, 229, which are generally angled toward each other, the legs 227, 229 may be arranged in any configuration suitable for transferring load through the console and cross-car beam assembly 200. Similarly, the legs 231, 233 may be configured in any arrangement suitable for load transfer through the console (e.g., parallel, angled outward, angled inward, etc.).

Figure 9:
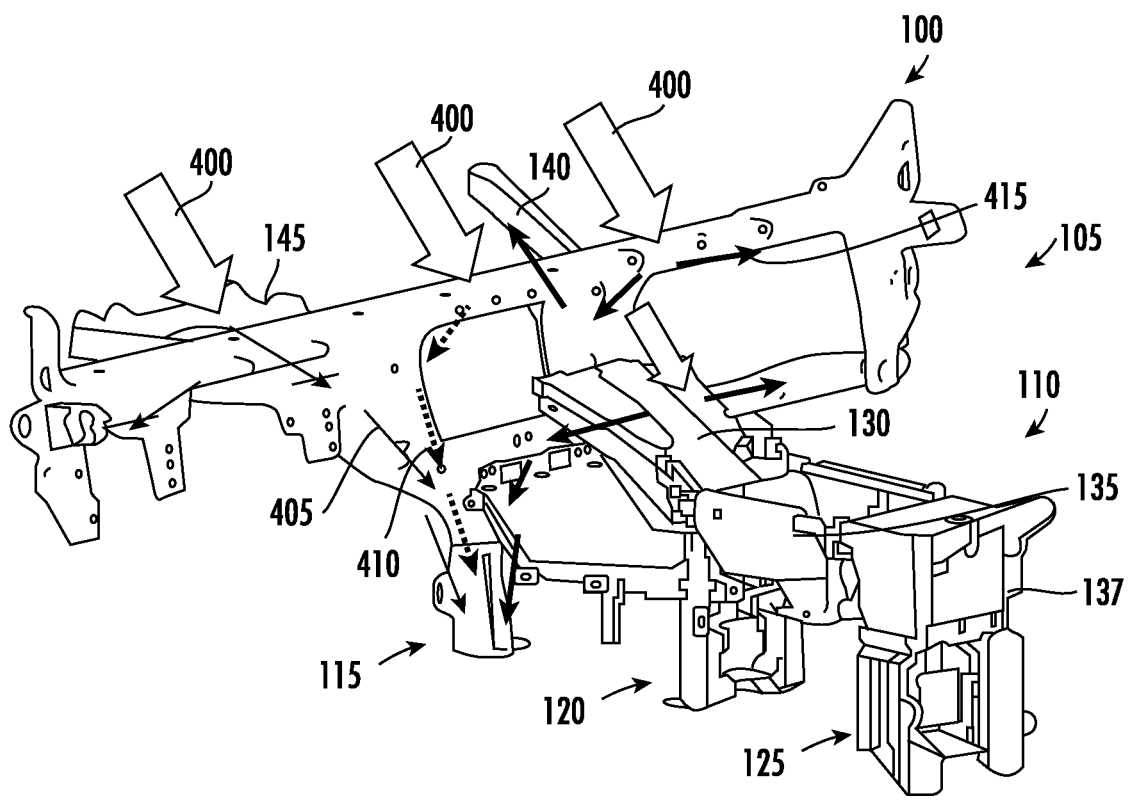
FIG. 9 is a free-body diagram illustrating force distribution through the console and cross-car beam assembly of FIG. 1.

During use, the console and cross-car beam assembly 200 is exposed to various loading patterns, which are acting on the vehicle. As described above, because of the configuration of the brackets 215, 220, the console and cross-car beam assembly 200 is uniquely suited for distributing load throughout the console 210 and transferring said load to the floor of the vehicle. As shown in FIG. 9, a load 400 (e.g., impact load) acting on the typical console and cross-car beam assembly 100 is received by the cross-car beam 105. A first portion 405 of the load 400 is transmitted through the support 145 and cross-car beam 105 and into the floor through the first floor attachment 115. Similarly, a second portion of the force 410 is transmitted through a central region of the cross-car beam 105 and again is transferred to the vehicle floor through the first floor attachment 115. The remaining load portions 415 act upon the cross-car beam 105 and, being largely unsupported by the console 110 (which may include mostly plastic components), is transferred to the vehicle floor through the first floor attachment 115. In various embodiments, the load 400 may be supported by an A-pillar of the vehicle, via transmission through one or more connection points within the cross-car beam assembly 200 (i.e., in addition to or instead of the first floor attachment 115). Accordingly, as shown in FIG. 9, the typical console and cross-car beam assembly 100 does not distribute load through the console 110. Moreover, the console 110, although not contributing to bearing the load 400, still requires additional structural components to facilitate storage and other utility within the vehicle. These added components increase the overall weight of the console and cross-car beam assembly 100 and, thus, the vehicle.

Figure 10:
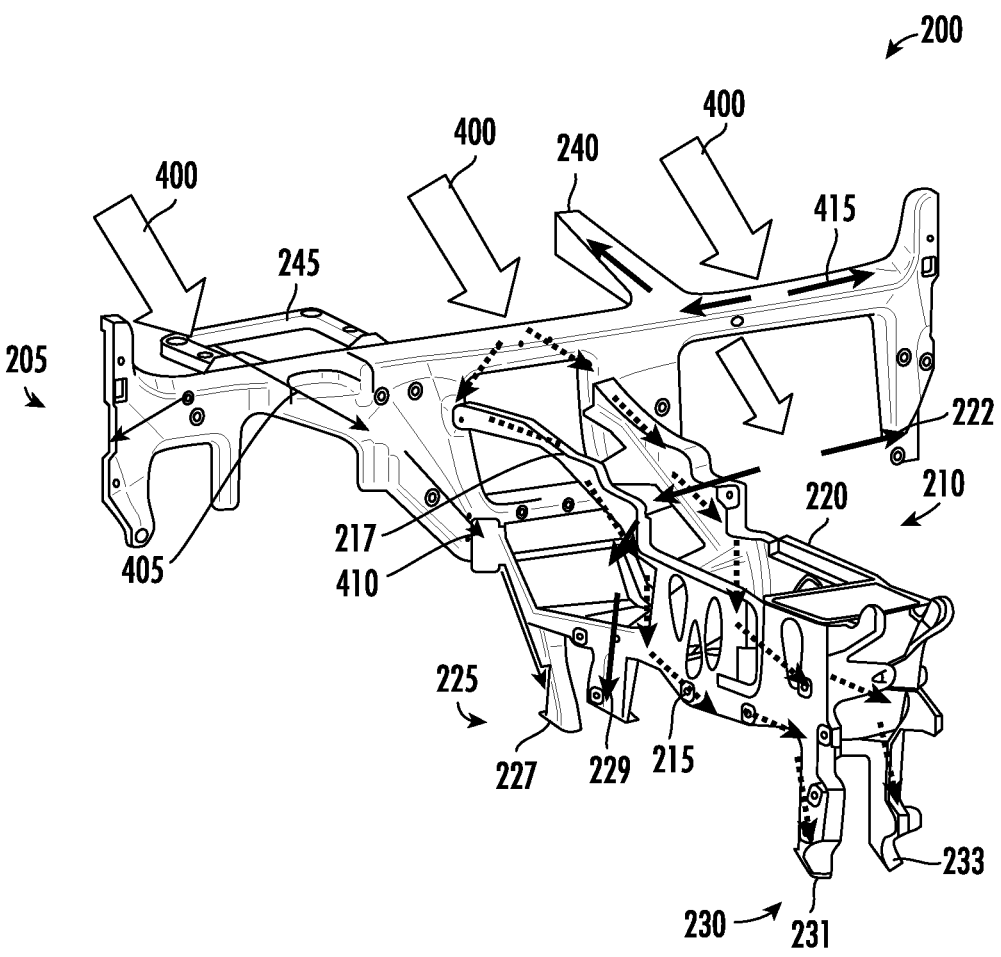
FIG. 10 is a free-body diagram illustrating force distribution through the console and cross-car beam assembly of FIG. 3, according to an exemplary embodiment.

Conversely, the console and cross-car beam assembly 200, which is shown in FIG. 10, receives the load 400 and transmits the first portion 405 through the first leg 227 of the first floor attachment 225 (and/or through the A-pillar of the vehicle), the second portion 410 through the console 210 (and through the second floor attachment 230), and the remaining portion 415 through the second leg 229 of the first floor attachment 225 (and/or through the A-pillar of the vehicle). Accordingly, the console and cross-car beam assembly 200 reduces number of parts, reduces overall weight, and increases performance as compared to the typical console and cross-car beam assembly 100.

In various embodiments, the console and cross-car beam assembly 200 may include components of varying materials to provide both structural integrity and reduce overall weight. In various embodiments, the receptacles 235, 250 may include one or more plastic or polymeric materials. In various embodiments, the brackets 215, 220 may include one or more metallic materials (e.g., magnesium, aluminum, etc.), which are lightweight and have mechanical properties suitable for withstanding loads 400 acting upon the vehicle.

In at least one embodiment, at least one of the brackets 215, 220 includes a magnesium casting, magnesium extrusion, magnesium sheet, a magnesium alloy, or another magnesium layer. The magnesium alloy may include, but is not limited to AE42, AE44, AM20, AM40, AM50, AM60, AM60B, AS21, AS41, AZ31, AZ61, AZ63, AZ80, AZ81, AZ91, Elektron 21, Elektron 675, EZ33, HK31, HM21, HZ32, K1A, LA141, LA103, LAZ43, M1, M1A, QE22, QH21, WE43, WE54, ZC63, ZC71, ZE41, ZK10, ZK20, ZK30, ZK40, ZK51, ZK60, ZK61, ZM21, ZMC711, any alloys with magnesium contents of 80% of higher, or a combination thereof. In various embodiments, the magnesium layer may include AM60B magnesium alloy, which includes about 5.5-6.5% aluminum (Al), about 0.24-0.6% manganese (Mn), at most about 0.22% zinc (Zn), at most about 0.1% silicon (Si), at most about 0.01% copper (Cu), at most about 0.005% iron (Fe), at most about 0.002% nickel (Ni), balance magnesium (Mg), and trace impurities. In yet other embodiments, the magnesium layer may be coated using an electrophoretic coating and/or a powder coat (e.g., N49).

In at least one embodiment, at least one of the brackets 215, 220 includes steel, which may have a variety of different compositions. In various embodiments, the steel may be a low carbon steel (e.g., mild steel) having iron alloyed with approximately 0.25 wt % carbon. In other embodiments, the steel may be a high carbon steel having iron alloyed with up to approximately 2.5 wt % carbon. In yet other embodiments, the steel may be a stainless steel having iron alloyed with chromium and nickel. In some embodiments, the steel may include at least one of iron, carbon, manganese, chromium, nickel, tungsten, molybdenum, boron, titanium, vanadium, cobalt, niobium, or a combination thereof. For example, the steel may be CR3 steel, which includes about 0.10% carbon (C), about 0.45% manganese (Mn), at most 0.03% sulfur (S), at most 0.04% phosphorus (P), balance iron (Fe), and trace impurities, a CR2 steel, a ferrite-martensite dual phase (DP) 600 steel, which includes about 0.10% carbon (C), about 1.4% manganese (Mn), about 0.14% silicon (Si), balance iron (Fe), and trace impurities, galfan (GF) steel and/or cold formed (CF) steel composite, advanced high strength (AHSS) steel, and/or another steel or steel alloy.

In at least one embodiment, at least one of the brackets 215, 220 includes aluminum, which may have a variety of different compositions. In various embodiments, the aluminum may be a 1000 series aluminum alloy, a 2000 series aluminum alloy, a 3000 series aluminum alloy, a 4000 series aluminum alloy, a 5000 series aluminum alloy, a 6000 series aluminum alloy, a 7000 series aluminum alloy, or an 8000 series aluminum alloy. In some embodiments, the 1000 series aluminum alloy (i.e. 1050, 1060, 1070, 1100, 1145, 1199, 1350, etc.) may be essentially pure aluminum with a minimum 99 wt % aluminum content and may be work hardened. In other embodiments, the 2000 series aluminum alloy (i.e. 2011, 2014, 2024, 2036, 2048, 2090, 2091, 2099, 2124, 2195, 2218, 2219, 2319, 2618, etc.) may be alloyed with copper. In yet other embodiments, the 3000 series aluminum alloy (i.e. 3003, 3004, 3005, 3102, 3103, 3105, 3303, etc.) may be alloyed with manganese. In various embodiments, the 4000 series aluminum alloy (i.e. 4006, 4007, 4015, 4032, 4043, etc.) may be alloyed with silicon. In some embodiments, the 5000 series aluminum alloy (i.e. 5005, 5010, 5019, 5026, 5050, 5052, 5056, 5059, 5083, 5086, 5154, 5182, 5252, 5254, 5356, 5454, 5456, 5457, 5652, 5657, 5754, Al3Mg, etc.) may be alloyed with magnesium. In other embodiments, the 6000 series aluminum alloy (i.e. 6005, 6009, 6010, 6060, 6061, 6063, 6063A, 6065, 6066, 6070, 6081, 6082, 6101, 6105, 6151, 6162, 6201, 6205, 6262, 6351, 6463, etc.) may be alloyed with magnesium and silicon. In some embodiments, the 7000 series aluminum alloy (i.e. 7005, 7039, 7049, 7050, 7068, 7072, 7075, 7079, 7116, 7129, 7175, 7178, 7475, etc.) may be alloyed with zinc. In yet other embodiments, the 8000 series aluminum alloy (i.e. 8011, 8090, etc.) may be alloyed with elements which are not covered by 1000-7000 series aluminum alloys.

In various embodiments, at least one of the brackets 215, 220 (or any other component within the console 210) may include any suitable material known in the art (e.g., metallic, non-metallic) and is not limited to magnesium, aluminum, or steel.

Notwithstanding the embodiments described above in FIGS. 1-10 various modifications and inclusions to those embodiments are contemplated and considered within the scope of the present disclosure.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the elements of the console as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Although the figures and description may illustrate a specific order of method steps, the order of such steps may differ from what is depicted and described, unless specified differently above. Also, two or more steps may be performed concurrently or with partial concurrence, unless specified differently above.

Other substitutions, modifications, changes and omissions may also be made in the design, operating conditions and arrangement of the various exemplary embodiments without departing from the scope of the present disclosure. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A console for a vehicle comprising:

a first bracket; and a second bracket disposed opposite the first bracket in a mirroring configuration relative to the first bracket;

wherein each of the first bracket and the second bracket comprises:

a body;

a portion protruding from a lower front portion of the body in a direction substantially parallel to a primary axis of the body, the lower front portion positioned at a first end of the console proximate to a floor of the vehicle, the first end facing a cross beam in the vehicle;

a first arm protruding from an upper front portion of the body and configured to couple to a vehicle frame, the upper front portion positioned at the first end of the console distal to the floor of the vehicle;

a second arm protruding from a distal end of the portion and configured to couple to the vehicle frame; and a first leg protruding from the distal end of the portion and configured to couple to the floor of the vehicle and a second leg protruding from a lower rear portion of the body, the lower rear portion positioned at a second end of the console opposite the first end and proximate to the floor of the vehicle, the second leg configured to couple to the floor of the vehicle; and wherein the first bracket and the second bracket are mutually coupled in at least one region.

2. The console of claim 1, wherein each of the first bracket and the second bracket comprises a magnesium alloy.

3. The console of claim 1, wherein each of the first bracket and the second bracket further comprises a third leg configured to couple to the floor of the vehicle.

4. The console of claim 1, wherein the first leg of the first bracket and the first leg of the second bracket are angled toward each other.

5. The console of claim 1, further comprising:

a first receptacle and a second receptacle;

wherein each of the first receptacle and the second receptacle are configured to be retained between the first bracket and the second bracket.

6. The console of claim 5, wherein at least one of the first receptacle or the second receptacle includes an upper lip, the upper lip being configured to engage with one or more retention features of each of the first bracket and the second bracket.

7. The console of claim 6, wherein at least one of the first bracket or the second bracket comprises one or more ridges.

8. The console of claim 1, wherein the first bracket and the second bracket are integrally formed.

9. A console for a vehicle comprising:

a first end and a second end opposite the first end;

a first bracket; and a second bracket disposed opposite the first bracket in a mirroring configuration relative to the first bracket;

wherein each of the first bracket and the second bracket comprises:

a body; and a portion protruding from a lower front portion of the body in a direction substantially parallel to a primary axis of the body, the lower front portion positioned at the first end of the console proximate to a floor of the vehicle, the first end facing a cross beam in the vehicle;

a first arm protruding from a distal end of the portion and configured to couple to a vehicle frame;

wherein the first arm protrudes toward the first end and the body is disposed at the second end;

a first floor attachment protruding from the distal end of the portion and configured to couple the console to a floor of the vehicle and a second floor attachment protruding from a lower rear portion of the body, the lower rear portion positioned at the second end of the console and proximate to the floor of the vehicle, the second floor attachment configured to couple the console to the floor of the vehicle; and wherein the first bracket and the second bracket are mutually coupled in at least one region.

10. The console of claim 9, wherein each of the first floor attachment and the second floor attachment comprises a first leg and a second leg.

11. The console of claim 9, wherein each of the first bracket and the second bracket further comprises a second arm extending from an upper front portion of the body, the upper front portion of the body positioned at the first end of the console distal to the floor of the vehicle.

12. The console of claim 11, wherein the second arm of the first bracket is conjoined with the second arm of the second bracket.

13. The console of claim 11, wherein each of the second arm of the first bracket and the second arm of the second bracket are configured to couple to the vehicle frame.

14. The console of claim 9, wherein the first bracket and the second bracket form at least one compartment therebetween.

15. The console of claim 14, further comprising at least one receptacle, wherein the at least one receptacle is configured to be received within the at least one compartment.

16. The console of claim 15, wherein the at least one compartment comprises a first compartment and a second compartment, wherein the at least one receptacle comprises a first receptacle and a second receptacle, and wherein the first receptacle is received within the first compartment and the second receptacle is received within the second compartment.

17. The console of claim 15, wherein the at least one receptacle is removably coupled to the at least one compartment.

18. The console of claim 9, wherein each of the first bracket and the second bracket include at least one protruding member extending from the body, the at least one protruding member configured to couple to at least one of a cover or lid.

19. The console of claim 9, wherein the first bracket and the second bracket are integrally formed.

20. The console of claim 19, wherein the first bracket and the second bracket are formed via casting.

* * * * *